Jan. 28, 1964  E. VALENTE  3,119,322
COFFEE MAKING MACHINE
Filed Oct. 4, 1961

INVENTOR:
ERNESTO VALENTE
By K.A. May
ATTORNEY

United States Patent Office 3,119,322
Patented Jan. 28, 1964

3,119,322
COFFEE MAKING MACHINE
Ernesto Valente, Via G. Ventura 5, Milan, Italy
Filed Oct. 4, 1961, Ser. No. 142,963
Claims priority, application Italy Oct. 8, 1960
1 Claim. (Cl. 99—291)

In the construction of express coffee making machines continual effort is made to eliminate groups with pistons that must be lifted by hand—which are cumbersome and hard to work—and also groups with a piston started by means of an auxiliary piston—which are more and more cumbersome, expensive and very hard to work—and to replace said groups with groups reduced to a really simple expression. But, on the other hand, the use of such simple groups requires the possibility of having available in the container—in which is prepared the water infusion—a pressure sufficient for distributing the product. As generally said pressure is not available in the water container, it is necessary to create, on the spot, such pressure by means of a pump.

This is the solution generally adopted, but this solution has some inconveniences, for instance the cost of operating the pump, which also operates during periods of time which do not require the use of pressure.

The present invention removes said inconveniences and is fully described, by way of example, in one of its preferred embodiments, in the attached drawing, in which.

Figure 1:
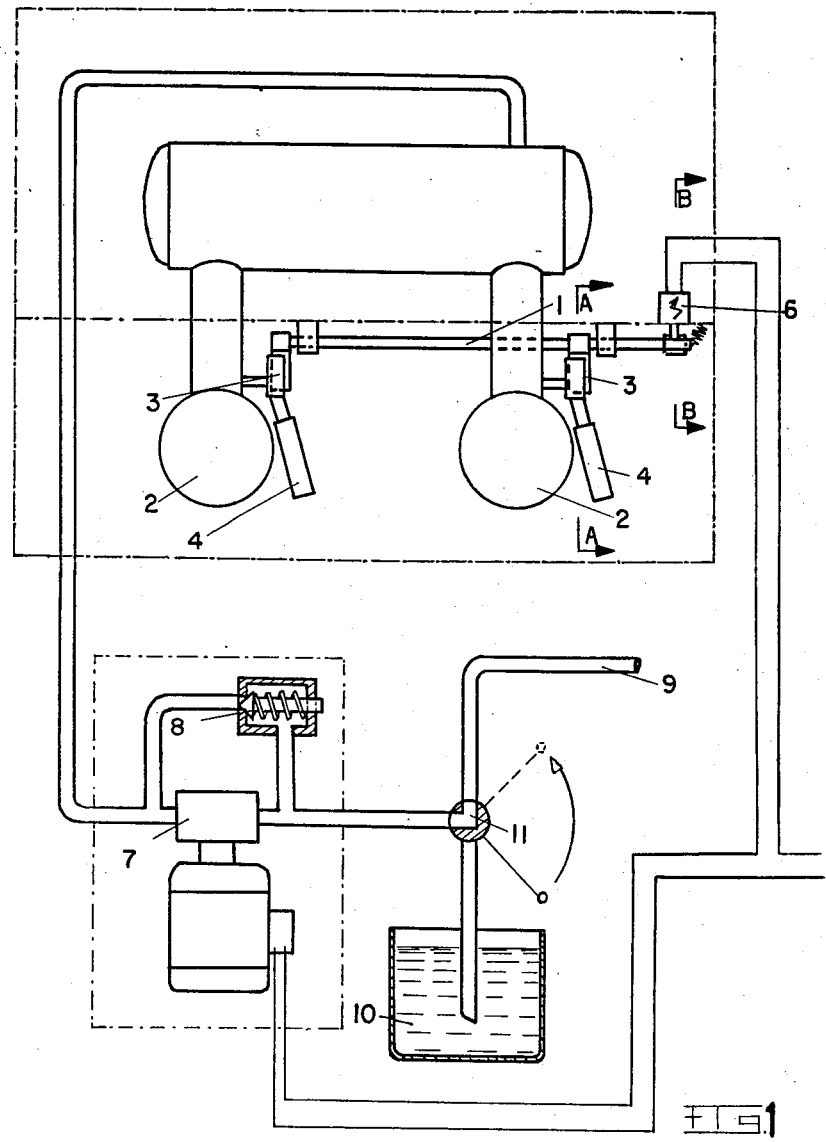
FIG. 1 is a schematical view of the device, according to the invention.
Figure 2:
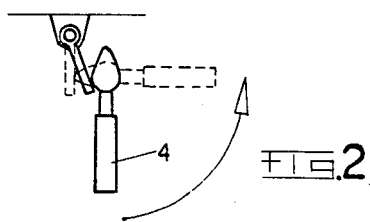
FIG. 2 is a sectional view as shown by the line A—A.
Figure 3:
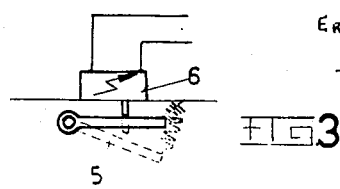
FIG. 3 is a sectional view as shown by the line B—B.

Along the groups 2 of the machine is placed a shaft 1, provided with a number of arms 3 (or cams) equal to the number of the groups, with said arms (or cams) being positioned to cooperate with the operating lever 4 of each distributing cock. The same shaft, upon rotating, actuates—through the arm 5 rigid with it—an electric contact 6, inserted in the electric circuit of the motor of the pump 7. The assembly is regulated in such manner that, every time a single group is starting to work, its lever 4 is actuated, said lever cooperating with the arm 3, corresponding with the shaft 1, making this latter rotate, and this latter, in its turn, by means of the arm 5, closes the circuit.

When the operating lever of the group returns into the initial position, the contact is opened and the motor is stopped.

Excess water, pumped in the pressing conduit, is returned by aspiration by means of the valve 8. The aspiring conduit of the pump may be placed, alternatively, in communication with the water container 9, or with a container 10, by means of a valve 11.

I claim:

A coffee-making machine having a water container for brewing, pump means for creating pressure in said container, an electric motor for driving said pump, and coffee-making groups connected to said container and supplied therefrom and having simple distributing cocks, a rotatable shaft disposed along said groups, a switch in the circuit of said motor and positioned to be actuated by said shaft upon rotation of said shaft, said shaft being provided with cams, and said cocks having manual operating levers each positioned to engage one of said cams to rotate said shaft to actuate said switch and energize said motor upon movement of one of said levers to open a cock, said shaft being rotatable solely by said levers.

References Cited in the file of this patent

UNITED STATES PATENTS 2,660,948    Forschner _____ Dec. 1, 1953